July 2, 1946.                    J. SWEENEY                    2,403,312
                                NONSKID CHAIN
                              Filed June 11, 1943
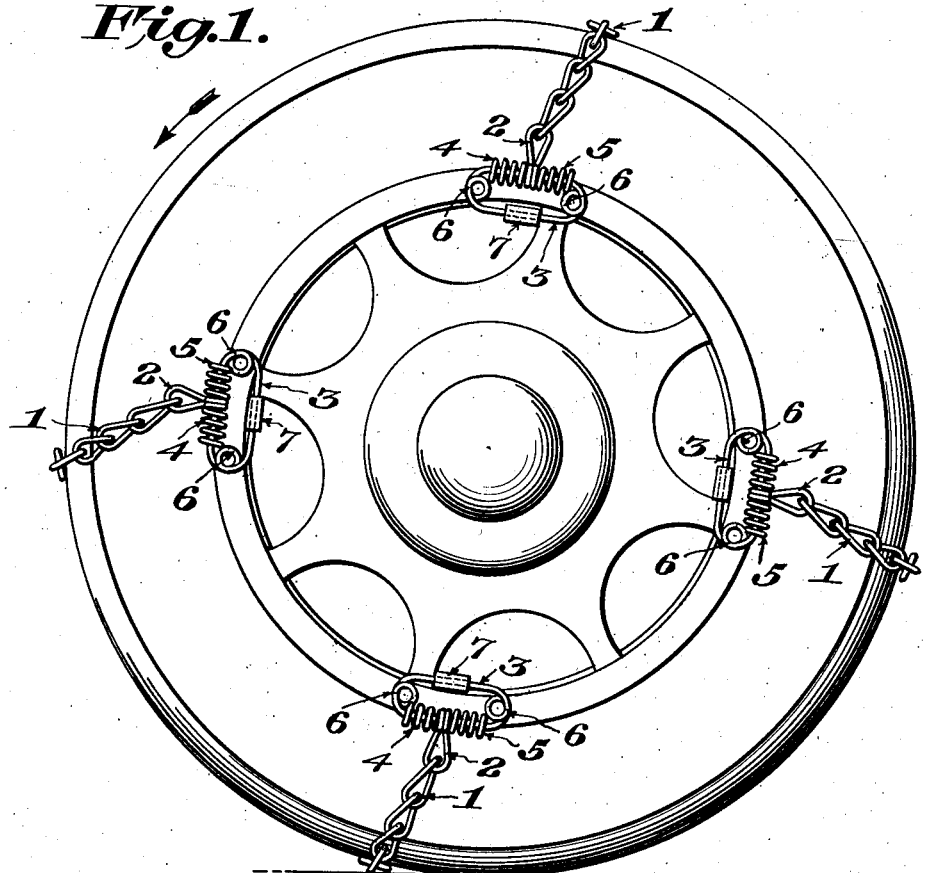
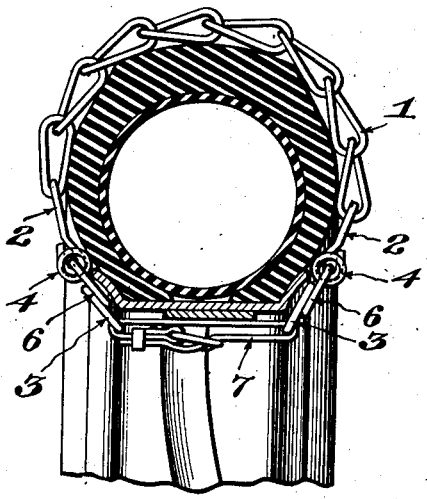
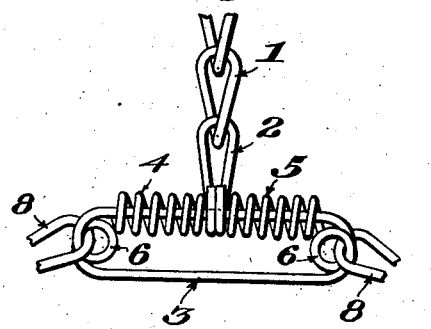
Inventor
James Sweeney,
By Lester L. Sargent
Attorney Patented July 2, 1946

2,403,312

UNITED STATES PATENT OFFICE 2,403,312

NONSKID CHAIN

James Sweeney, Detroit, Mich.

Application June 11, 1943, Serial No. 490,512

2 Claims. (Cl. 152—231)

The object of my invention is to provide a novel non-skid chain mounted in such a manner as to allow it to give under the tension of traction to a certain extent so that the tire will ride over it instead of cutting into the tread.

I attain the objects of my invention by the means illustrated in the accompanying drawing, in which—

Figure 1 is a side elevation of my invention in use on a tire;

Fig. 2 is a transverse section through the tire adjacent to my non-skid chain; and Fig. 3 is a detail view of a portion of my non-skid chain.

Referring to the accompanying drawing, I provide a non-skid chain 1 having its end link 2 engaged to an elongated link 3 which is disposed apparently parallel with the felly of the tire. Mounted on the elongated link 3 are coil springs 4 and 5 disposed on opposite sides of the end link 2 of the non-skid chain and engaging around the elongated links 3. The elongated link 3 is provided with a coil 6 at each end to give it a degree of resilience. The function of the coil 6 is to hold the chain in snug engagement with the tire tread. In consequence of this function the cross chain will engage the roadbed at the proper time and place, but when the brakes are applied, will allow some stretch to the chain by reason of the resilient action of the coil 6. The link 3 may be secured in place over the felly by suitable connecting means such as the strap 7. Or a series of the links 3 may be connected to each other by additional links 8.

If it is desired a chain of the type which is permitted to creep around the automobile tire instead of being tightly secured in one position on the felly of the tire, as illustrated in Fig. 1 may be provided by omitting the straps 7 and providing links 8 connecting the links 3 to each other. Link 2 is normally held in a median position on the elongated links 3 by the opposed coil chains 4 and 5, but under the tension of traction, as shown in the lowermost non-skid chain 1, illustrated in Fig. 1, tension is exerted by the end link 2 on one of the coil springs 4, whereby same is compressed and the tire rides over the chain instead of exerting great tension on it and causing it to cut into the tread, as the coil spring takes up the tension.

The main drawback with "creeping" as now used is the timing is not rhythmical that is, having the cross chain drop in front of the wheel on the road bed. By my unique arrangement of having the cross chain attached between two springs I time the movement of cross chain to always fall so that there will be resilience and not a dragging movement. The chain drops on the road at the proper time and place, the weight of the car holds against the road bed for moment, like the shoe on a tractor, the front springs contract or compress allowing the wheel to pass the center of gravity when the spring snaps back into place. The rear spring is put there so that when brakes are applied the action is reversed and the cross chain stays under the wheel, steadies the car and prevents a side movement or skidding.

What I claim is:

1. In a non-skid chain, the combination of a series of transversely disposed non-skid chains, a series of elongated links to which the respective end links of each of the non-skid chains are engaged, coil springs mounted on each of the elongated links and disposed on opposite sides of each of the respective end links of the non-skid chain, whereby the ends of the coiled spring will engage the end links of the non-skid chains to take up tension exerted on said chain and allow the non-skid chain a limited degree of movement under the stress of traction to prevent its cutting into the tread, each of said elongated links having a loop formed at each end to increase the resilience of said links.

2. In a non-skid chain the combination of a series of transversely disposed non-skid chains, a series of elongated links to which the respective end links of each of the non-skid chains are engaged, coil springs mounted on each of the elongated links and disposed on opposite sides of each of the respective end links of the non-skid chain, whereby the ends of the coiled spring will engage the end links of the non-skid chains to take up tension exerted on said chain and allow the non-skid chain a limited degree of movement under the stress of traction to prevent its cutting into the tread, each of said elongated links having a loop formed at each end to increase the resilience of said links, and means for engaging the elongated links to retain the non-skid chain in operative position on the tire.

JAMES SWEENEY.